(12) United States Patent
Kayano

(10) Patent No.: US 11,891,672 B2
(45) Date of Patent: Feb. 6, 2024

(54) SURFACE PROFILE DETECTION APPARATUS OF BURDEN IN BLAST FURNACE AND OPERATION METHOD COMPRISING AN ANGLE FIXED REFLECTION PLATE TO TRANSMIT THE DETECTION WAVE FROM AN ANTENNA TO THE REFLECTION SURFACE OF AN ANGLE VARIABLE REFLECTION PLATE

(71) Applicant: WADECO CO., LTD., Amagasaki (JP)

(72) Inventor: Hayae Kayano, Amagasaki (JP)

(73) Assignee: WADECO CO., LTD., Amagasaki (JP)

( * ) Notice: Subject to any disclaimer, the term of this patent is extended or adjusted under 35 U.S.C. 154(b) by 540 days.

(21) Appl. No.: 16/973,650

(22) PCT Filed: Mar. 23, 2020

(86) PCT No.: PCT/JP2020/012799
§ 371 (c)(1),
(2) Date: Dec. 9, 2020

(87) PCT Pub. No.: WO2020/241008
PCT Pub. Date: Dec. 3, 2020

(65) Prior Publication Data
US 2021/0254188 A1    Aug. 19, 2021

(30) Foreign Application Priority Data

May 31, 2019  (JP) .................................. 2019-102613
Jul. 9, 2019   (JP) .................................. 2019-127900

(51) Int. Cl.
*C21B 7/24*   (2006.01)
*C21B 5/00*   (2006.01)
*G01B 15/04*  (2006.01)

(52) U.S. Cl.
CPC .................. *C21B 7/24* (2013.01); *C21B 5/00* (2013.01); *G01B 15/04* (2013.01)

(58) Field of Classification Search
CPC .... C21B 7/24; C21B 5/00; C21B 7/22; F27D 21/00; F27D 25/00
(Continued)

(56) References Cited

U.S. PATENT DOCUMENTS

| 4,322,627 A | 3/1982 | Pirlet |
| 4,858,892 A | 8/1989 | Kreuz et al. |

(Continued)

FOREIGN PATENT DOCUMENTS

| CN | 101492750 A | 7/2009 |
| CN | 101749932 A | 6/2010 |

(Continued)

OTHER PUBLICATIONS

International Search Report dated Jun. 9, 2020 issued by the International Searching Authority in counterpart International Application No. PCT/JP2020/012799 (PCT/ISA/210).

(Continued)

*Primary Examiner* — Que Tan Le
(74) *Attorney, Agent, or Firm* — Sughrue Mion, PLLC

(57) ABSTRACT

A surface profile detection apparatus of a burden in a blast furnace includes a rotating plate mounted immediately above an opening part of the blast furnace and configured to rotate about an opening center of the opening part as a central axis, a rotating means for rotating the rotating plate, and a transmission and reception means for transmitting a detection wave such as a microwave or a millimeter wave in a linear shape along a diametrical direction of the rotating plate and receiving the detection wave. The surface profile detection apparatus performs transmission and reception in a direction orthogonal to a rotating direction of the rotating (Continued)

plate while rotating the rotating plate in synchronization with turning of the shooter so that transmission of the detection wave is not interrupted.

6 Claims, 12 Drawing Sheets

(58) Field of Classification Search
USPC .................................. 250/221, 239, 554
See application file for complete search history.

(56) References Cited

U.S. PATENT DOCUMENTS

| | | | | |
|---|---|---|---|---|
| 4,912,987 | A | * | 4/1990 | Yashiro .................. G01N 15/02 356/336 |
| 2011/0193274 | A1 | | 8/2011 | Lu et al. |
| 2011/0241924 | A1 | | 10/2011 | Yamamoto et al. |
| 2016/0341825 | A1 | | 11/2016 | Morgenstern et al. |
| 2017/0184437 | A1 | | 6/2017 | Welle et al. |
| 2018/0209004 | A1 | | 7/2018 | Kayano et al. |

FOREIGN PATENT DOCUMENTS

| | | |
|---|---|---|
| CN | 102197275 A | 9/2011 |
| CN | 105695652 A | 6/2016 |
| CN | 106702060 A | 5/2017 |
| EP | 0 291 757 A1 | 11/1988 |
| EP | 3 299 480 A1 | 3/2018 |
| JP | 6-11328 A | 1/1994 |
| JP | 2010-145407 A | 7/2010 |
| JP | 5391458 B2 | 1/2014 |
| JP | 201748421 A | 3/2017 |
| JP | 2017-512300 A | 5/2017 |
| JP | 2019-100648 A | 6/2019 |
| KR | 10-2010-0076394 A | 7/2010 |
| TW | 201127963 A1 | 8/2011 |
| WO | 2015/120883 A1 | 8/2015 |
| WO | 2017/164358 A1 | 9/2017 |

OTHER PUBLICATIONS

International Written Opinion dated Jun. 9, 2020 issued by the International Searching Authority in counterpart International Application No. PCT/JP2020/012799 (PCT/ISA/237).
Communication for observations by a third party dated Dec. 14, 2021, issued by the European Patent Office in counterpart European Application No. 20814854.4.
Communication dated Feb. 17, 2022 issued by the Intellectual Property Office of the P.R.China in application No. 202080003286.2.

\* cited by examiner

SURFACE PROFILE DETECTION APPARATUS OF BURDEN IN BLAST FURNACE AND OPERATION METHOD COMPRISING AN ANGLE FIXED REFLECTION PLATE TO TRANSMIT THE DETECTION WAVE FROM AN ANTENNA TO THE REFLECTION SURFACE OF AN ANGLE VARIABLE REFLECTION PLATE

CROSS-REFERENCE TO RELATED APPLICATIONS

This application is a National Stage of International Application No. PCT/JP2020/012799 filed Mar. 23, 2020, claiming priority based on Japanese Patent Application No. 2019-102613, filed May 31, 2019, and claiming priority based on Japanese Patent Application No. 2019-127900, filed Jul. 9, 2019, the contents of all of which are incorporated herein by reference in their entirety.

TECHNICAL FIELD

The present invention relates to a detection apparatus configured to detect a surface profile of iron ore, coke and limestone (hereinbelow, collectively referred to as "burden") in a blast furnace. The present invention also relates to a method of supplying the burden and performing a stable operation, based on the surface profile of the burden.

BACKGROUND ART

In a blast furnace, when a deposited state of burden is optimized, a gas flow in the furnace becomes stable, so that the fuel cost can be saved and the service life of a furnace body can be extended. In order to obtain an optimized deposited state, it is necessary to accurately measure a surface profile of the burden in a short time, and to supply the burden so as to be a theoretical deposited state, i.e., "theoretical deposition profile" obtained in advance. In a general conventional method of measuring the surface profile, as shown in FIG. 16, a detection wave M1 is emitted toward a surface of a burden 20 from an antenna 11 mounted to a tip end of a lance 10 inserted into a blast furnace 1 through the blast furnace 1, a reflected detection wave M2 from the surface of the burden 20 is received by the antenna 11, and a distance from the antenna 11 to the surface of the burden 20 is measured by a frequency of a beat wave obtained by mixing. In the method, the distance is measured while moving the lance 10, so that a surface profile of the burden 20 is obtained.

However, in the lance-type detection apparatus, since the lance 10 is linearly moved, only a linear surface profile, i.e., a two-dimensional surface profile of the burden 20 is obtained. The lance 10 is also required to have a length corresponding to about an inner diameter of the furnace and is thus a high-load member. Therefore, when the lance is inserted long in the furnace, the lance is sagged downward by its own weight, so that the lance cannot be taken out from the furnace. Since a stroke upon movement is large, it is also necessary to secure a large space outside of the furnace. It is also necessary to separately provide a drive unit for moving the lance 10, so that the facility cost and the operating cost increase. In addition, since the lance 10 becomes an obstacle when supplying the burden, it is not possible to supply the burden during the profile measurement, so that it is not possible to perform the rapid loading operation corresponding to the measured surface profile.

It is also performed to detect a surface profile of an entire surface of the burden. For example, the present applicant suggested a detection apparatus disclosed in PTL 1. That is, as shown in FIG. 17, a detection apparatus 30 is mounted in an opening part 2 provided in the vicinity of a furnace top of a blast furnace 1, and includes an antenna 32 of a transmission and reception means 31 of a detection wave M and a reflection plate 33 disposed to face each other, and the reflection plate 33 is configured so that an inclination angle X toward an inside of the blast furnace 1 and a rotation angle Y about an antenna axis line passing through a center of an opening portion of the antenna 32 can vary. By controlling the inclination angle X and the rotation angle Y, the detection wave M is caused to scan the surface of the burden 20 concentrically or spirally to detect an entire surface, i.e., a three-dimensional surface profile of the burden 20.

CITATION LIST

Patent Literature

[PTL 1] Japanese Patent No. 5,391,458

SUMMARY OF INVENTION

Technical Problem

For the supply of the burden, a shooter (200, in FIG. 1) disposed at the furnace top and configured to turn about a central axis of the blast furnace is widely used. The conventional detection apparatuses configured to detect a three-dimensional surface profile, including the detection apparatus of PTL 1, scan the entire surface of the burden 20 in a stripe shape, a concentric shape or a spiral shape, which requires time for measurement. The measurement is also performed after the shooter makes one turn, and while the shooter is turning, an actual deposited state of the burden at each position of the turning is not detected. If a deposited state of the burden can be detected while the shooter is turning, the deposited state can be reflected in a turning mode while the shooter is turning next time, so that the operation can be performed closer to the theoretical deposition profile.

The iron ore, coke and limestone that are burdens are alternately dropped from the shooter and are deposited in a layer shape. However, since drop positions from the shooter are different depending on types and particle diameters of the burdens, the drop positions are estimated for each of types and particle diameters of the burdens by calculation equations and the burdens are then dropped. For this reason, if an actual drop position at each position of the turning can be detected while the shooter is turning, it can be more accurately reflected in a next turning mode of the shooter of the same type of the burden. However, the drop position cannot be reflected in the conventional method where it is detected after the shooter makes one turn.

Furthermore, in the detection apparatus 30 disclosed in PTL 1, it is necessary to control the inclination angle X and the rotation angle Y simultaneously, accurately and at high speed, so that loads on a drive device and a control device of the reflection plate 33 used for control of the inclination angle X and the rotation angle Y increase.

It is therefore an object of the present invention to provide a surface profile detection apparatus of a burden in a blast furnace having a simple apparatus configuration and capable of detecting a deposited state of the burden while a shooter is turning and enabling an operation close to a theoretical deposition profile.

Solution to Problem

In order to achieve the above object, the present invention provides a surface profile detection apparatus of a burden in a blast furnace and an operation method.

(1) A surface profile detection apparatus of a burden in a blast furnace,
wherein the surface profile detection apparatus is configured to detect a surface profile of the burden such as iron ore, coke, limestone and the like in the blast furnace, to which the burden is supplied by a shooter, by transmitting a detection wave toward a surface of the burden deposited in the furnace and receiving the detection wave reflected on the surface of the burden, through an opening part of the blast furnace,
wherein the surface profile detection apparatus includes:
a rotating plate mounted immediately above the opening part and configured to rotate about an opening center of the opening part as a central axis,
a rotating means for rotating the rotating plate, and
a transmission and reception means for transmitting the detection wave in a linear shape along a diametrical direction of the rotating plate and receiving the detection wave, and
wherein the surface profile detection apparatus is configured to perform transmission and reception by the transmission and reception means while rotating the rotating plate in synchronization with turning of the shooter so that transmission of the detection wave is not interrupted.

(2) In the surface profile detection apparatus of a burden in a blast furnace according to the above (1),
wherein a central part of the rotating plate is formed with an opening,
wherein the surface profile detection apparatus includes:
a tubular rotary shaft attached concentrically with the opening of the rotating plate and having an antenna accommodated therein,
the transmission and reception means mounted above an end portion of the rotary shaft on an opposite side to the opening part and connected to the antenna,
an angle variable reflection plate disposed in a space between the rotating plate and the opening part, and having a reflection surface whose angle is variable, and
an angle fixed reflection plate disposed in a space between the rotating plate and the opening part, having a reflection surface whose angle is fixed, and provided so as to transmit the detection wave from the antenna to the reflection surface of the angle variable reflection plate, and
wherein the angle variable reflection plate and the angle fixed reflection plate are attached to the rotating plate.

(3) In the surface profile detection apparatus of a burden in a blast furnace according to the above (2),
wherein the angle fixed reflection plate includes a first angle fixed reflection plate configured to reflect the detection wave from the antenna, a second angle fixed reflection plate disposed to face the first angle fixed reflection plate and configured to reflect the detection wave reflected on the first angle fixed reflection plate, and a third angle fixed reflection plate disposed to face the second angle fixed reflection plate and configured to reflect the detection wave reflected on the second angle fixed reflection plate, and
wherein the surface profile detection apparatus is configured to transmit the detection wave reflected on the third angle fixed reflection plate toward the angle variable reflection plate.

(4) In the surface profile detection apparatus of a burden in a blast furnace according to the above (1),
wherein an angle variable reflection plate having a reflection surface whose inclination angle is variable and an angle fixed reflection plate having a reflection surface whose inclination angle is fixed are disposed to face each other along the diametrical direction of the rotating plate, and
wherein the surface profile detection apparatus is configured to reflect the detection wave transmitted from the transmission and reception means on the angle fixed reflection plate and to transmit the same to the angle variable reflection plate, and to control an inclination angle of the reflection surface of the angle variable reflection plate.

(5) In the surface profile detection apparatus of a burden in a blast furnace according to the above (1),
wherein the surface profile detection apparatus includes a plurality of antenna elements, and a phase shifter configured to electrically control directionality of the detection wave from the antenna elements, and is configured to align the directionality of the detection wave with the diametrical direction of the rotating plate.

(6) In the surface profile detection apparatus of a burden in a blast furnace according to the above (5),
wherein the antenna elements are divided into an antenna element group for transmission and an antenna element group for reception.

(7) In the surface profile detection apparatus of a burden in a blast furnace according to one of the above (1) to (6),
wherein the detection wave is a microwave or a millimeter wave.

(8) In the surface profile detection apparatus of a burden in a blast furnace according to one of the above (1) to (7),
wherein the surface profile detection apparatus is configured to intermittently perform scanning in the diametrical direction of the rotating plate and to perform transmission and reception by the transmission and reception means each time turning of the shooter is progressed by a predetermined angle.

(9) An operation method comprising:
measuring a surface profile of the burden by using the surface profile detection apparatus of a burden in a blast furnace according to one of the above (1) to (8), and supplying the burden, based on the surface profile.

(10) In the operation method according to the above (9), wherein the supply of the burden is performed by controlling a drop position or a drop amount of the burden from the shooter.

In descriptions below, "the surface profile detection apparatus of a burden in a blast furnace" is simply referred to as "the detection apparatus".

Advantageous Effects of Invention

According to the present invention, the detection apparatus has a simple apparatus configuration and can detect a deposited state of the burden while the shooter is turning and enable a favorable operation closer to a theoretical deposition profile.

DESCRIPTION OF EMBODIMENTS

Hereinbelow, the present invention will be described in detail with reference to the drawings.

First Embodiment

Figure 1:
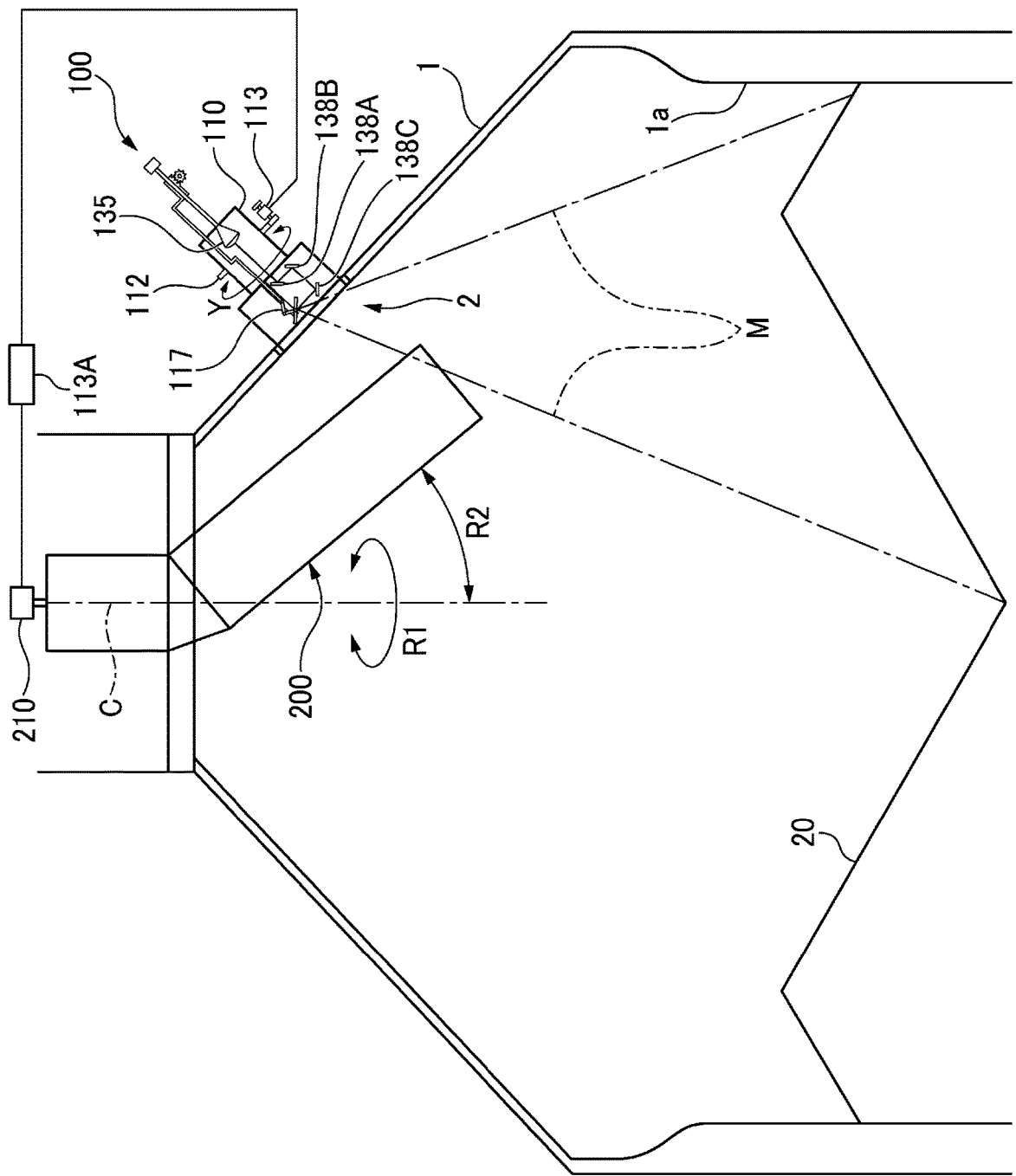
FIG. 1 is a schematic view depicting a first embodiment of the detection apparatus of the present invention, showing a state in which the detection apparatus is mounted to a blast furnace.
Figure 2:
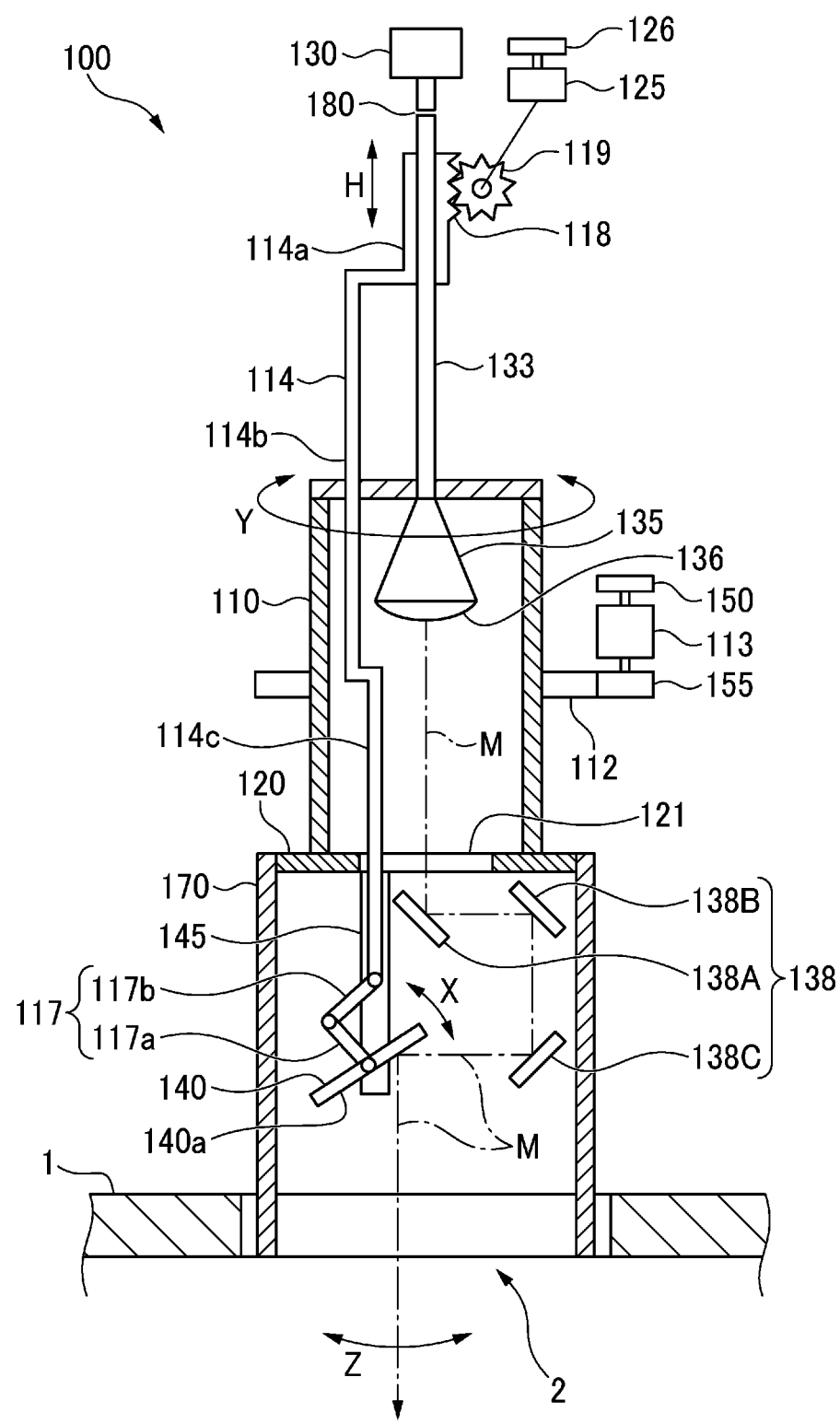
FIG. 2 depicts a configuration of the detection apparatus shown in FIG. 1.
Figure 3:
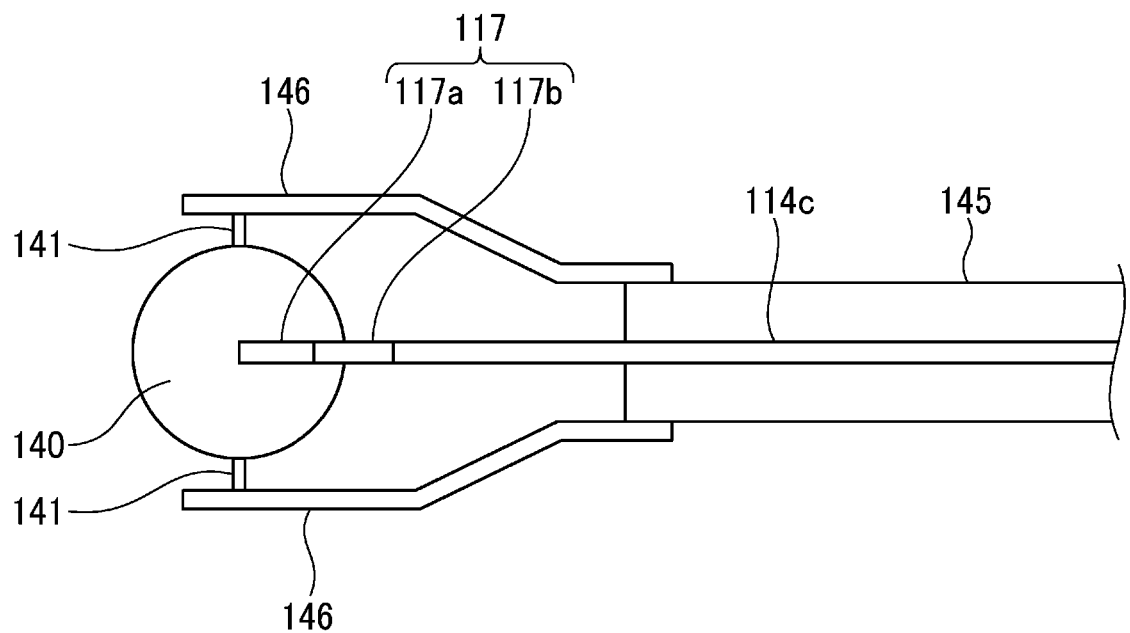
FIG. 3 depicts an angle variable reflection plate of the detection apparatus shown in FIG. 1, as seen from a backside of the reflection plate.

FIG. 1 is a schematic sectional view taken along an axis line of a blast furnace, depicting a state in which the detection apparatus of the present invention is mounted to the blast furnace, and FIGS. 2 and 3 depict a configuration of the detection apparatus.

As shown in FIG. 1, a blast furnace 1 is supplied with iron ore, coke, limestone and the like, which are burden 20, by a shooter 200. The shooter 200 is configured to turn in a direction denoted with a reference sign R1 about an axis line C of the blast furnace 1, and to control a drop position of the burden 20 by changing an inclination angle R2 relative to the axis line C. The shooter 200 may be a well-known shooter, and a turning angle in the R1 direction is detected by an encoder 210. The burden 20 dropped from the shooter 200 is deposited in the furnace of the blast furnace 1.

An opening part 2 is formed in the vicinity of a furnace top of the blast furnace 1, and a detection apparatus 100 is mounted in the opening part 2. As shown in FIG. 2, the detection apparatus 100 includes a rotating plate 120 configured to rotate horizontally with respect to the opening part 2 of the blast furnace 1 about a rotary shaft 110, as shown with a reference sign Y.

The rotating plate 120 is a circular plate having a circular ring shape whose central part is opened. The central opening of the rotating plate 120 is denoted with a reference sign 121.

The rotary shaft 110 has a cylindrical shape, is configured to accommodate therein an antenna 135, and is attached concentrically with the opening 121 of the rotating plate 120. The antenna 135 is connected to a transmission and reception means 130 of a detection wave M via a waveguide 133. The waveguide 133 has a configuration where an upper end portion of a coupling rod 114 on the transmission and reception means 130-side is disconnected and the transmission and reception means 130 is not thus rotated. Note that, the disconnected portion is denoted with a reference sign 180 but an interval of a gap is set smaller than a wavelength of the detection wave M so that the detection wave M is not leaked. The waveguide 133 also coincides with an axis line of the rotary shaft 110. Note that, a dielectric lens 136 formed of fluorine resin or the like may also be attached to an antenna surface of the antenna 135 so as to improve directionality of the detection wave M. In addition, it is also possible to handle a millimeter wave as the detection wave M by the dielectric lens 136. Furthermore, when the antenna 135 is configured by a parabolic antenna or a Cassegrain antenna, it is possible to reduce a vertical dimension in the drawing of the detection apparatus 100 as a whole and to omit the dielectric lens 136.

An outer peripheral surface of the rotary shaft 110 is provided with a gear 112, and the gear 112 is in mesh with a gear 155 of a motor 113. Therefore, when the motor 113 is driven, the rotary shaft 110 rotates, as shown with a reference sign Y in FIG. 2, and the rotating plate 120 correspondingly rotates horizontally with respect to the opening part 2 of the blast furnace 1 in the same direction as the rotary shaft 110.

In a space below the rotating plate 120 and between the rotating plate and the opening part 2 of the blast furnace 1, an angle fixed reflection plate 138 and an angle variable reflection plate 140 for transmitting the detection wave M into the furnace and receiving the detection wave are disposed.

The angle fixed reflection plate 138 is a reflection plate having a reflection surface whose inclination angle is fixed to 45°, and includes a first angle fixed reflection plate 138A, a second angle fixed reflection plate 138B, and a third angle fixed reflection plate 138C. The first angle fixed reflection plate 138A faces the antenna surface (the dielectric lens 136, in the shown example) of the antenna 135 through the opening 121 of the rotating plate 120. The second angle fixed reflection plate 138B is disposed to face the first angle fixed reflection plate 138A, and the third angle fixed reflection plate 138C is disposed to face the second angle fixed reflection plate 138B. For this reason, as shown with the dashed-dotted line in FIG. 2, the detection wave M transmitted from the antenna 135 is reflected on the first angle fixed reflection plate 138A, is transmitted to the second angle fixed reflection plate 138B, is reflected on the second angle fixed reflection plate 138B, and is then transmitted to the third angle fixed reflection plate 138C. Then, the detection wave is reflected on the third angle fixed reflection plate 138C and is transmitted to the angle variable reflection plate 140.

The first angle fixed reflection plate 138A, the second angle fixed reflection plate 138B and the third angle fixed reflection plate 138C are attached to a fixed member (not shown) hanging down from the rotating plate 120 toward the opening part 2 of the blast furnace 1. Alternatively, the first angle fixed reflection plate 138A, the second angle fixed reflection plate 138B and the third angle fixed reflection plate 138C may also be attached to a sidewall 170 extending from the rotating plate 120 toward the opening part 2 of the blast furnace 1 and attached to a peripheral edge of the rotating plate 120.

Note that, it is preferably to use a microwave or a millimeter wave as the detection wave M because temperature inside of the furnace is high and dust and water vapor exist in the furnace. In particular, the millimeter wave is preferable because the millimeter wave has a shorter wavelength and higher directionality than the microwave.

The angle variable reflection plate 140 is a reflection plate having a reflection surface 140a whose inclination angle varies in a direction denoted with a reference sign X in FIG. 2. In the angle variable reflection plate 140, a first link 117a of a link mechanism 117 is fixed to a center of an opposite surface (backside) to the reflection surface 140a and a second link 117b is coupled to the first link 117a. The second link 117b is also coupled with the coupling rod 114 penetrating an inside of the rotary shaft 110 through the opening 121 of the rotary shaft 110, and an end portion of the coupling rod 114 on an opposite side to the second link 117b is formed with a rack gear 118.

The coupling rod 114 has an outer tube part 114a where the waveguide 133 connecting the antenna 135 and the transmission and reception means 130 each other is an inner tube, and the rack gear 118 is formed on an outer peripheral surface of the outer tube part 114a. The rack gear 118 is in mesh with a gear 119 of a motor 125, so that when the motor 125 is driven, the gear 119 is rotated and the rotation is converted into a linear motion by the rack gear 118. Herein, the motor 125 is connected to an encoder 126, so that a rotation amount of the motor 125 and a rotation amount of the gear 119 are detected.

The coupling rod 114 has also an intermediate part 114b extending toward the rotating plate 120 with avoiding the antenna 135 inside of the rotary shaft 110. An end portion of the outer tube part 114a on the rotary shaft 110-side is bent outward, and the intermediate part 114b continues to the bent portion.

The intermediate part 114b has also a lower end portion 114c extending toward the opening part 2 of the blast furnace 1 through the opening 121 of the rotating plate 120. The lower end portion 114c is coupled to the second link 117b of the link mechanism 117.

The coupling rod 114 is configured as described above, and rotation of a motor (not shown) is converted into a linear motion by the rack gear 118 via the gear 119, so that the coupling rod 114 is moved linearly toward the angle variable reflection plate 140 or toward an opposite side, as shown with a reference sign H in FIG. 2.

Although not shown, a portion of the waveguide 133 on the antenna 135-side may be made to be freer than the rotary shaft 110 so that even when the rotary shaft 110 rotates, the waveguide 133 does not rotate. In this way, the waveguide 133 may not be disconnected by a separated portion 180.

In addition, as shown in FIG. 3, support shafts 141 and 141 protrude from both diametrical ends of the angle variable reflection plate 140, and the support shafts 141 and 141 are rotatably supported to support arms 146 and 146. The support arms 146 and 146 are attached to a support arm holding rod 145 attached to the rotating plate 120.

When the coupling rod 114 moves toward (moves down in FIG. 2) the angle variable reflection plate 140, the reflection surface 140a of the angle variable reflection plate 140 is tilted toward an inner wall 1a of the blast furnace 1 via the link mechanism 117, and when the coupling rod 114 moves toward (moves up in FIG. 2) an opposite side to the angle variable reflection plate 140, the reflection surface 140a of the angle variable reflection plate 140 is tilted toward the axis line C of the blast furnace 1 via the link mechanism 117. That is, the coupling rod 114 moves down and up, so that the inclination of the reflection surface 140a of the angle variable reflection plate 140 can be changed in a direction denoted with a reference sign X in FIG. 2.

In association with this, the detection wave M transmitted from the third angle fixed reflection plate 138C of the angle fixed reflection plate 138 to the angle variable reflection plate 140 swings in the right and left direction in FIG. 2 as shown with a reference sign Z and is transmitted into the furnace in a linear shape along a diametrical direction of the rotating plate 120. An amplitude of the detection wave M by the angle variable reflection plate 140 is adjusted so that the detection wave M moves in a linear shape from the inner wall 1a of the blast furnace 1 to the axis line C, for example, as shown in FIG. 1.

The detection wave M is reflected on the surface of the burden 20 deposited in the furnace, travels along the same path as that upon transmission and is then received by the transmission and reception means 130. The transmission and reception can be performed in an FM-CW method, for example. That is, the detection wave M (transmission wave) transmitted from the antenna 135 connecting to the transmission and reception means 130, reflected on the angle fixed reflection plates 138A to 138C, transmitted to the angle variable reflection plate 140 and transmitted from the angle variable reflection plate 140 by a predetermined angle is transmitted into the furnace through the opening part 2 of the blast furnace 1, and is then reflected on the surface of the burden 20, so that a reflected wave thereof travels along an opposite path (the angle variable reflection plate 140→the angle fixed reflection plate 138C to 138A→the antenna 135→the transmission and reception means 130) and is then detected by the transmission and reception means 130. Then, distance information between the transmission and reception means 130 and the surface of the burden 20 is obtained from a frequency difference (beat frequency) between the transmission wave and the reflected wave.

Figure 4:
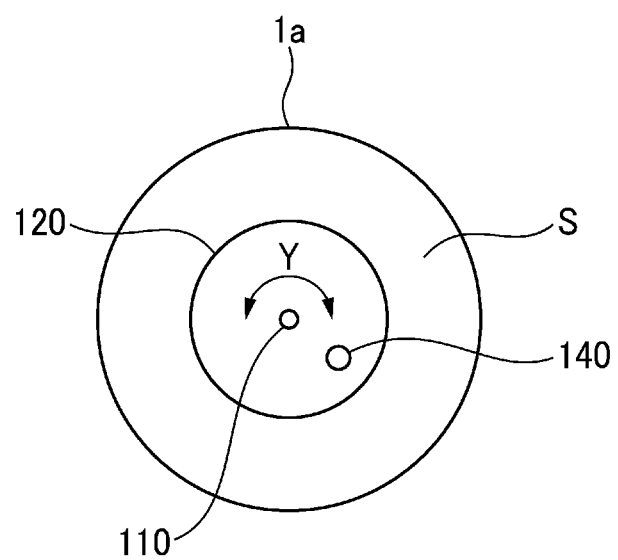
FIG. 4 depicts a scanning area of the detection apparatus shown in FIG. 1.
Figure 5:
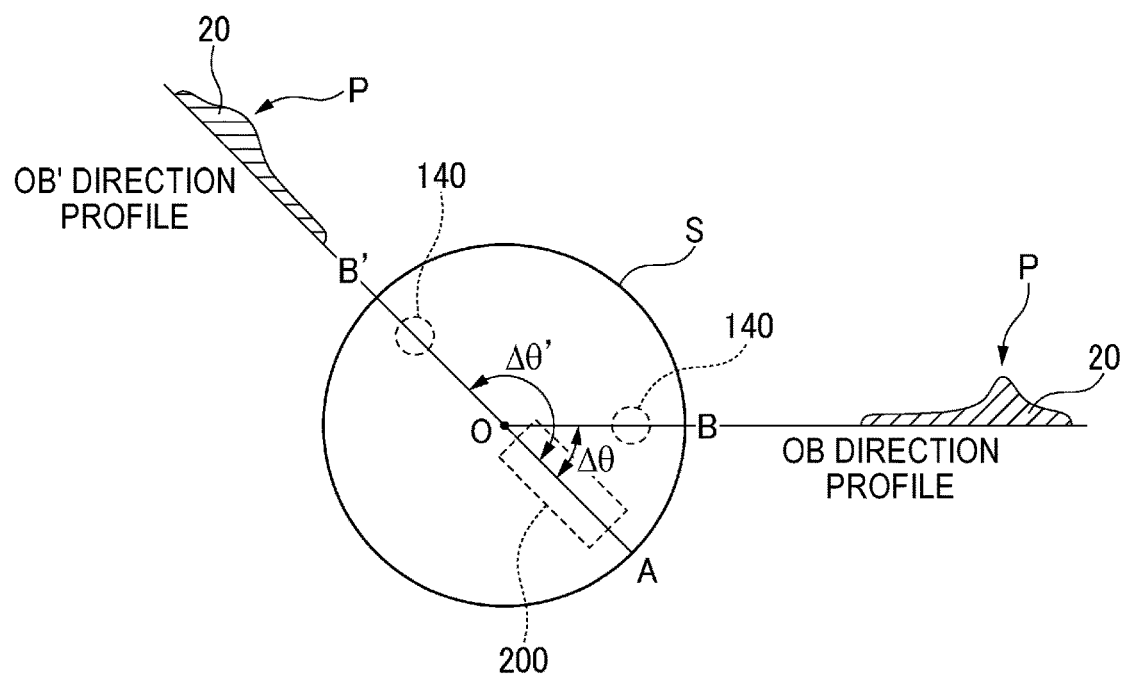
FIG. 5 depicts a scanning area of the detection apparatus shown in FIG. 1 and a turning trajectory of a shooter in an overlapping manner.

The detection wave M is linearly transmitted and received by rotating the rotating plate 120 about the rotary shaft 110, so that distance information of a circular part (hereinbelow, referred to as "scanning area S") over an entire area in the furnace of the blast furnace 1 is obtained. On the other hand, since a rotation angle of the rotary shaft 110 corresponding to a rotation position of the rotating plate 120 is detected by an encoder 150 connecting to the motor 113, position information of the detection wave M in the scanning area S is obtained, as shown in FIG. 4. In addition, the inclination angle of the reflection surface 140a of the angle variable reflection plate 140 is detected and the diametrical position information, i.e., a position in an OB direction (which will be described later; FIG. 5) of the rotating plate 120 is detected, from the rotation amounts of the motor 125 and the gear 119 by the encoder 126. From the distance information and the position information, a surface profile of the scanning area S, i.e., the entire surface of the burden 20 is obtained.

Note that, although the transmission and reception by the transmission and reception means 130 may be continuously performed according to the rotation of the rotating plate 120, the transmission and reception by the transmission and reception means 130 may also be performed intermittently each time the rotating plate 120 rotates by a predetermined angle.

In the above detection, the angle variable reflection plate 140 is simply tilted according to the rotation of the rotating plate 120. Therefore, as compared to a case where the entire surface is scanned at one time, it is possible to simplify the apparatus and to reduce a load of a drive source.

The rotation of the rotating plate 120 is also synchronized with the turning of the shooter 200. The rotation of the rotating plate 120 is controlled by a motor control circuit 113A connected to the motor 113. The position information of the encoder 150 is synchronized with the position information of the encoder 210 that controls the turning of the shooter 200.

Note that, "synchronize" means that when the shooter 200 stops, the rotating plate 120 also stops, when the shooter 200 starts to turn, the rotating plate 120 also starts to rotate, and a turning direction of the shooter 200 and a rotation direction of the rotating plate 120 are the same and a turning speed of the shooter 200 and a rotation speed of the rotating plate 120 are the same.

When the turning of the shooter 200 and the rotation of the rotating plate 120 are synchronized and the rotation of the rotating plate 120 is stopped, the diametrical linear transmission and reception at a rotation stop position are repeated, so that the change in deposited state of the burden 20 at the same position can be measured.

FIG. 5 depicts the scanning area S of the detection apparatus 100 and a turning trajectory of the shooter 200 in an overlapping manner. That is, FIG. 5 is a view where since the shooter 200 turns about the axis line C of the blast furnace 1, the axis line C of the blast furnace 1 and the rotary shaft 110 of the rotating plate 120 of the detection apparatus 100 are virtually overlapped at a center O. Also, the circle corresponds to the scanning area S.

Here, when a position of the axis line of the shooter 200 on the circle shown in FIG. at any time is denoted as A and a position of the angle variable reflection plate 140 of the detection apparatus 100 at the same time is denoted as B, FIG. 5 depicts that transmission and reception are performed by the detection apparatus 100 at any time after a time corresponding to a phase difference Δθ from the shooter 200 elapses. Note that, the transmission and reception by the detection wave M at the position B are linearly performed along a radius OB of the same circle. Since the turning of the shooter 200 and the rotation of the rotating plate 120 of the detection apparatus 100 are synchronized, the deposited state of the burden 20 is always detected after the time corresponding to the phase difference Δθ elapses.

For this reason, in the turning of the shooter 200 until the last time, the deposited state of the burden 20 is measured and stored at the time the shooter 200 has reached the position A and is compared to the deposited state of the burden 20 measured at the time the shooter 200 reaches the position A this time. When there is a difference in the deposited state, it is possible to take measures such as changing a drop position and a drop amount of the burden 20 from the shooter 200 immediately after the shooter 200 passes the position A.

Although the burden 20 is one where iron ore, coke, limestone and the like are alternately deposited in a layer shape, the drop positions are different depending on types and particle sizes of the burden 20. In the related art, the drop positions are estimated for each of types and particle diameters of the burdens 20 by calculation equations and the inclination angle (R2 in FIG. 1) of the shooter 200 is adjusted. According to the present invention, since it is possible to detect the deposited state for each of types of the burden 20 at a time close to immediately after the burden 20 is deposited, the deposited state can be reflected in correction of the drop position for each of the same types of the burden 20 when the shooter 200 turns.

The phase difference Δθ can be arbitrarily set. The smaller the phase difference Δθ is, it is possible to detect the deposited state of the burden 20 in a state close to immediately after the deposition.

Also, it is possible to compare the deposited state of the burden 20 at a different phase difference Δθ. For example, as shown in FIG. 5, a diametrically opposite side to the position A of the shooter 200 can be set as the scanning position. In this case, the scanning position is denoted as B' and the phase difference is denoted as Δθ'. The deposited state of the burden 20 changes over time after the deposition. The deposited state of the burden 20 at Δθ (OB direction profile) and the deposited state of the burden 20 at Δθ' (OB' direction profile) are pictorially shown. In both the states, a peak P is seen near the drop position from the shooter 200. However, in the deposited state at Δθ', the peak P is smaller, and the deposited state is gentler as a whole and changes over time. Like this, it may be preferably to measure the deposited state of the burden 20 at the time the deposited state becomes stable after any time elapses, other than immediately after the burden is dropped from the shooter 200.

In addition, the deposited state of the burden 20 is detected at the two places of the scanning position B and the scanning position B', and a degree of change in the deposited state between the scanning position B and the scanning position B' can be reflected in the turning mode of the shooter 200.

Note that, the measurement position is not limited to the two places of the position B and the position B' and may also be three or more places.

When detecting the deposited state of the burden 20, the scanning in the diametrical direction of the rotating plate 120 may be continuously performed in synchronization with the turning of the shooter 200. However, the scanning in the diametrical direction of the rotating plate 120 may also be intermittently performed each time the turning of the shooter 200 is progressed by a predetermined angle.

In the above, the detection apparatus 100 is one. However, a plurality of the detection apparatuses 100 may also be mounted to the blast furnace 1. For example, in FIG. 1, the detection apparatus 100 is mounted to the right side of the axis line C of the blast furnace 1. However, the detection apparatus 100 may also be mounted to another position (the left side in FIG. 1) about the axis line C of the blast furnace 1. In this way, the detection apparatuses 100 are disposed at the two left and right sides about the axis line C of the blast furnace 1, so that even though the shooter 200 under turning interrupts the detection wave M and a range in which the surface profile of the burden 20 cannot be detected is thus generated, the two detection apparatuses 100 can complement each other. Since the two detection apparatuses 100 can share the scanning area S, the measurement time can also be shortened to a half. When the measurement is performed for the same time, the resolution can be enhanced by increasing the number of measuring points. For example, in a case where the detection apparatus 100 is one and the measurement is performed each time the shooter 200 turns by 10°, if the two detection apparatuses 100 are mounted and Δθ is made different from each other by 5°, the measurement is performed each time the shooter 200 turns by 5°, so that the number of measuring points per one turn of the shooter 200 can be doubled to enhance the resolution.

In the meantime, it is expected that high-temperature heat, dust, water vapor and the like from the inside of the furnace are introduced toward the detection apparatus 100 from the opening part 2 of the blast furnace 1 and interfere with the detection. Therefore, upon the measurement, a purge gas (not shown) such as nitrogen gas may be supplied continuously or intermittently into the inside of the rotary shaft 110 or a space formed by the rotating plate 120 and the sidewall 170. The opening part 2 may also be blocked by a filter (not shown) having air permeability and obtained by knitting ceramic heat-resistant fibers such as "Tyranno fiber" available from Ube Industries, Ltd., and the purge gas may be ejected toward the inside of the furnace. In addition, a metallic mesh (not shown) may be provided below the filter to prevent collision of the burden 20 from the inside of the furnace upon the ejection. The tip end of the antenna 135 may also be blocked by an adiabatic material and a filter having air permeability, and the purge gas may be supplied between the adiabatic material and the filter. In addition, an opening and closing valve (not shown) for blocking the opening part 2 may be mounted. Alternatively, a moving means (not shown) for vertically moving up and down the detection apparatus 100 as a whole with respect to the opening part 2 may also be mounted, the moving means may be moved to a position close to the opening part 2, as shown, during the measurement, and may be retreated from the opening part 2 during non-measurement, and the opening part 2 may be further blocked by the opening and closing valve.

Furthermore, a range of the shooter 200 in which transmission of the detection wave M is not interrupted may be detected by the encoder 210, the turning of the shooter 200 may be stopped within the range, and the surface of the burden 20 may be scanned for a while, so that the resolution may be further enhanced to perform the measurement with accuracy.

Second Embodiment

Figure 6:
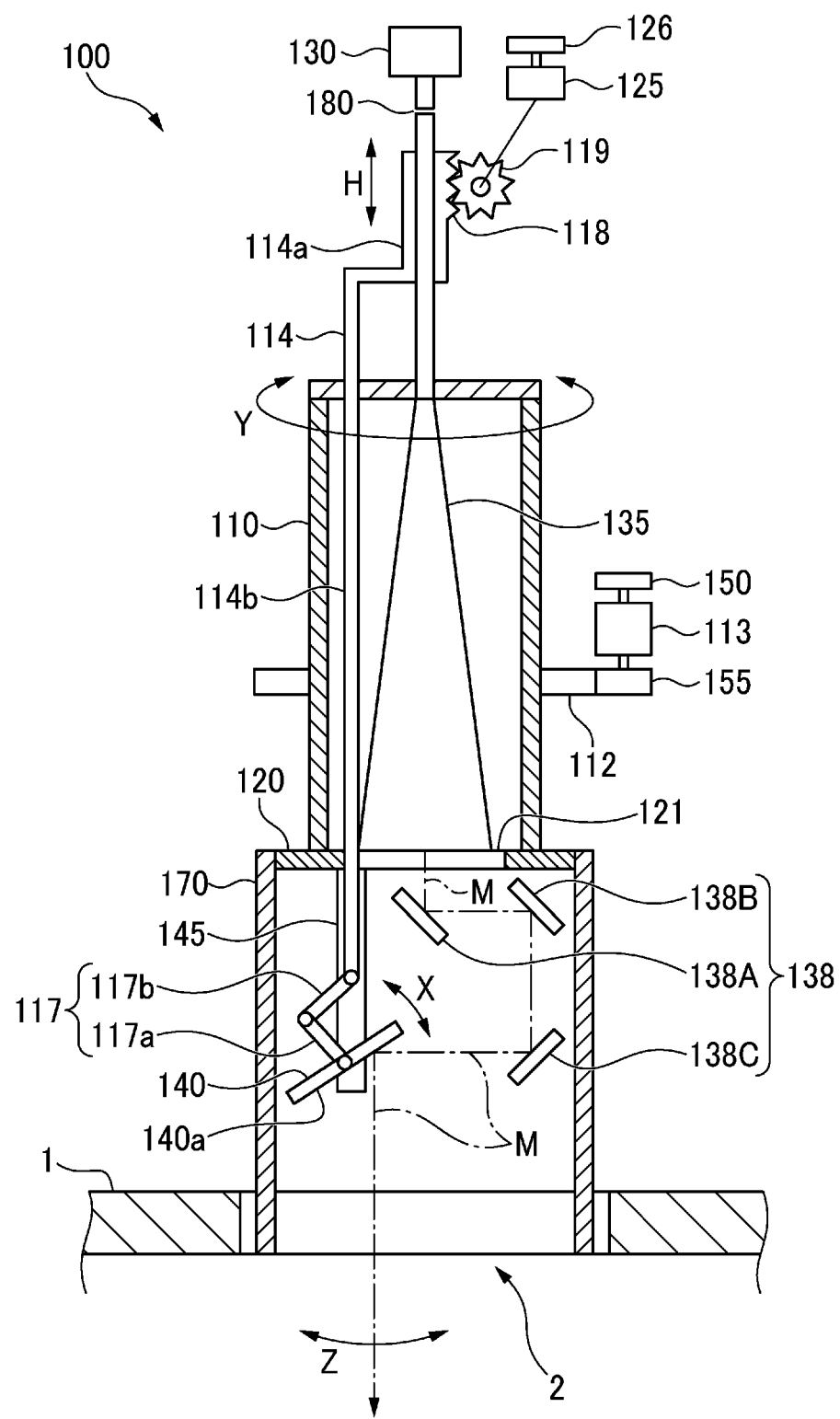
FIG. 6 depicts a second embodiment of the detection apparatus.

FIG. 6 depicts a second embodiment of the detection apparatus 100. As shown in FIG. 6, a horn length of the antenna 135 may be lengthened. The horn length of the antenna 135 is lengthened, so that it is possible to handle the transmission and reception of the millimeter wave without using the dielectric lens 136 of the first embodiment, and the horn length is adjusted so as to be suitable for the transmission and reception of the millimeter wave.

The antenna surface of the antenna 135 can extend up to a place near the opening 121 of the rotating plate 120. In association with this, the intermediate part 114b of the coupling rod 114 may be formed to extend through the opening 121 of the rotating plate 120 and to couple to the second link 117b of the link mechanism 117 without the lower end portion 114c shown in FIG. 2. Note that, also in the first embodiment, the lower end portion 114c may be omitted.

Except that the horn length of the antenna 135 is lengthened, the second embodiment is similar to the first embodiment and the descriptions thereof are omitted herein.

As described above, according to the detection apparatus 100 of the present invention, since the transmission and reception means 130 that is an electric component is mounted farthest from the opening part 2 of the blast furnace 1, the transmission and reception means 130 stably operates without being affected by the high-temperatures of the blast furnace 1. The encoder 150 of the rotating plate 120 that is an electric component is also mounted in the position distant from the opening part of the blast furnace 1 and is not thermally affected.

In the first embodiment and the second embodiment, the moving means (not shown) for moving up and down the detection apparatus 100 as a whole with respect to the opening part 2 may be mounted, the moving means may be positioned at or near the opening part 2 during the measurement and may be retreated from the opening part 2 during the non-measurement, and the opening part 2 may be further blocked by the opening and closing valve (not shown). The transmission and reception of the detection wave M are performed at or near the opening part 2, so that the opening diameter of the opening part 2 can be reduced to reduce the influence of the heat from the blast furnace 1 and the construction cost can be reduced.

Third Embodiment

Figure 7:
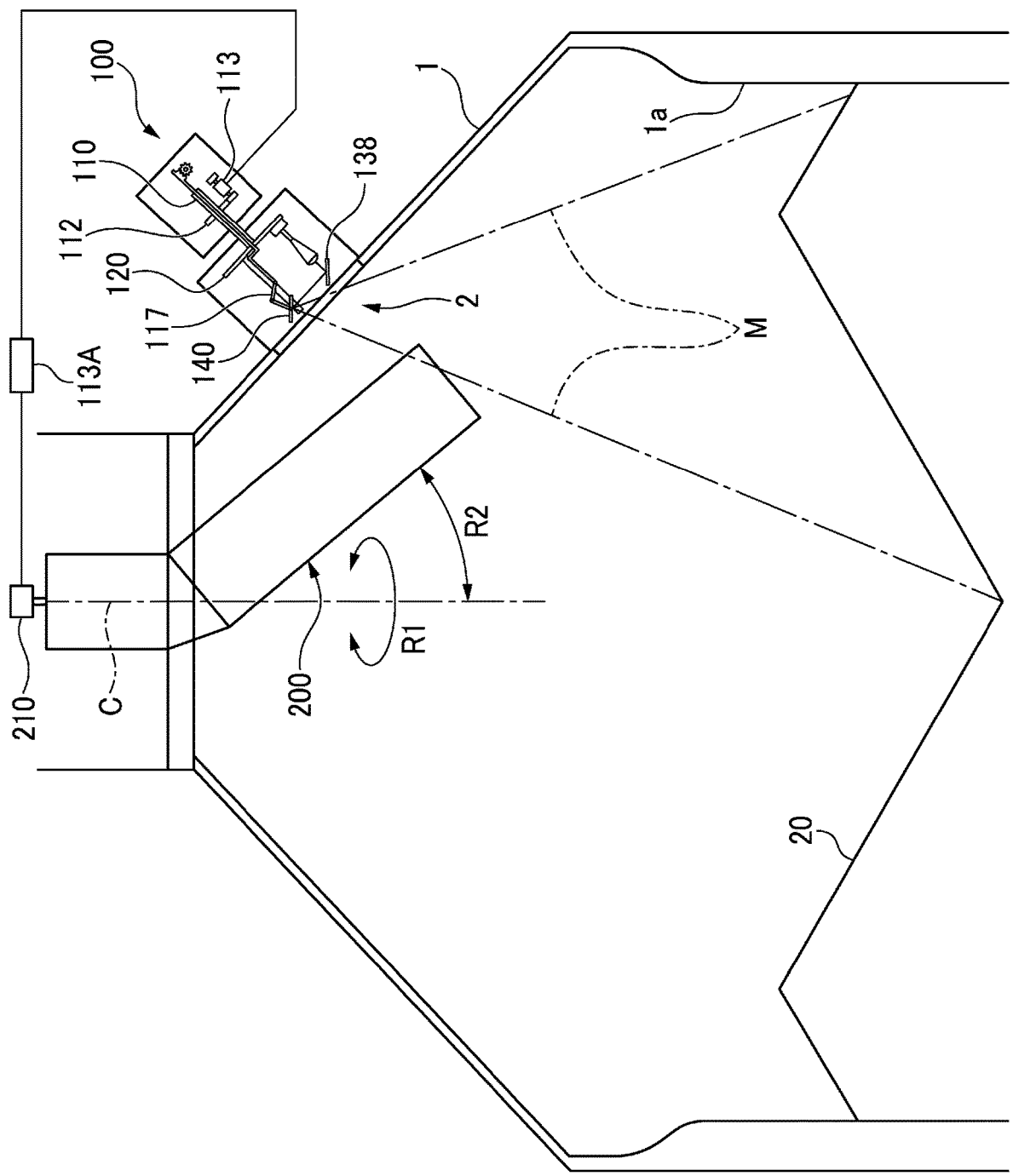
FIG. 7 is a schematic view depicting a third embodiment of the detection apparatus, showing a state in which the detection apparatus is mounted to the blast furnace.
Figure 8:
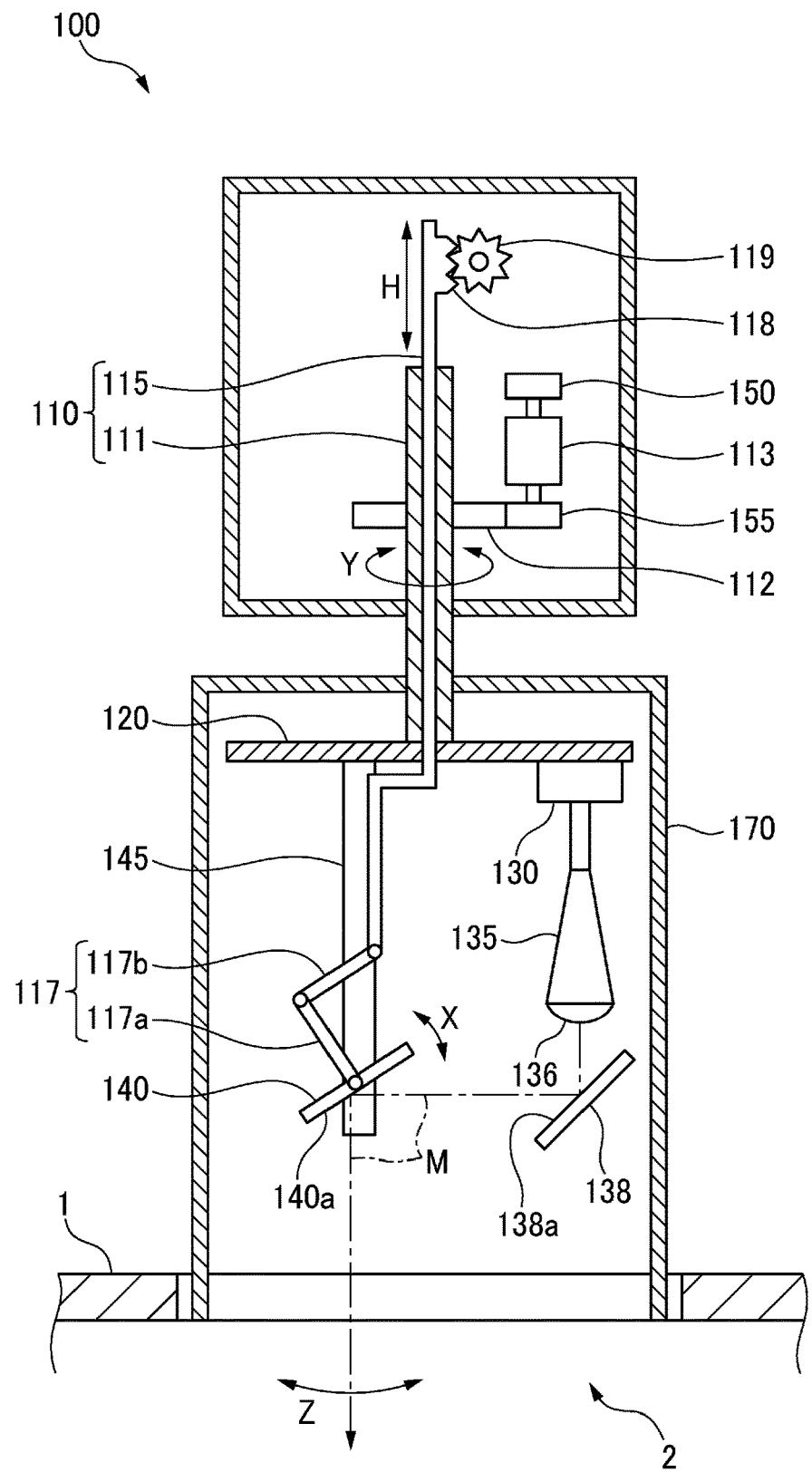
FIG. 8 depicts a configuration of the detection apparatus shown in FIG. 7.
Figure 9:
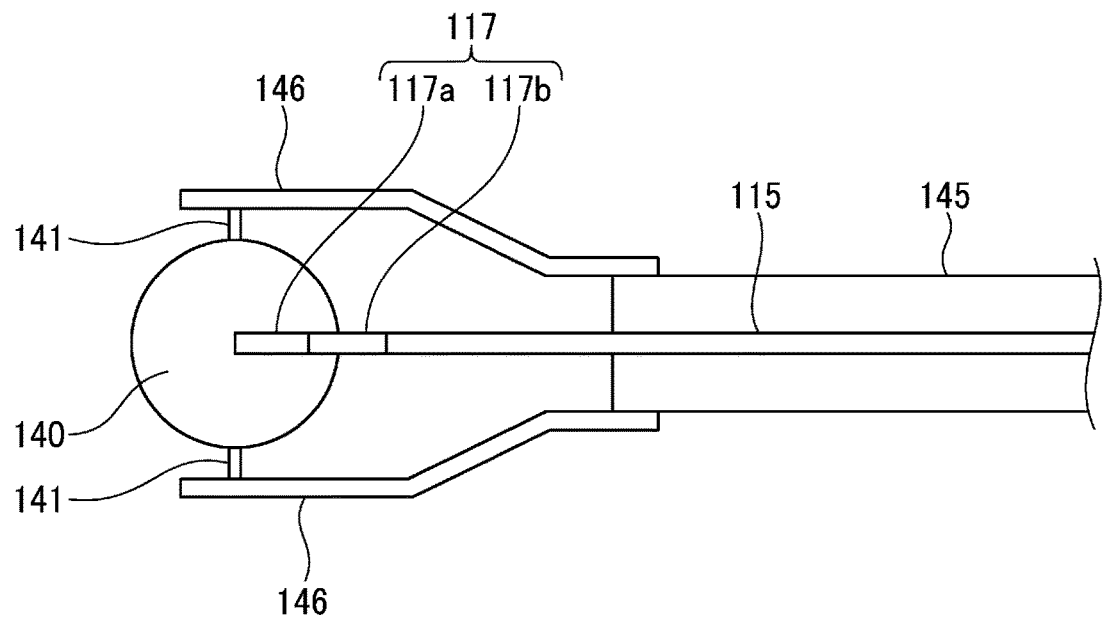
FIG. 9 is a plan view of an angle variable reflection plate of the detection apparatus shown in FIG. 7.

FIG. 7 is a schematic sectional view taken along the axis line of the blast furnace depicting a third embodiment of the detection apparatus of the present invention, showing a state in which the detection apparatus is mounted to the blast furnace, and FIGS. 8 and 9 depict a configuration of the detection apparatus.

As shown in FIG. 7, the blast furnace 1 is supplied with a burden 20 such as iron ore, coke and limestone by a shooter 200. The shooter 200 is configured to turn in a direction denoted with a reference sign R1 about an axis line C of the blast furnace 1, and to control a drop position of the burden 20 by changing an inclination angle R2 relative to the axis line C. The shooter 200 may be a well-known shooter, and a turning angle in the R1 direction is detected by an encoder 210. The burden 20 dropped from the shooter 200 is deposited in the furnace of the blast furnace 1.

An opening part 2 is formed in the vicinity of a furnace top of the blast furnace 1, and a detection apparatus 100 is mounted in the opening part 2. As shown in FIG. 8, the detection apparatus 100 includes a rotating plate 120 configured to rotate horizontally with respect to the opening part 2 of the blast furnace 1 about a rotary shaft 110, as shown with a reference sign Y. The rotating plate 120 may be a circular plate. A transmission and reception means 130 for transmitting and receiving the detection wave M is mounted on a lower surface of the rotating plate 120. The transmission and reception means 130 is connected to an antenna 135, and an angle fixed reflection plate 138 having a reflection surface 138a whose inclination angle is fixed is disposed immediately below the antenna 135. In order to increase the directionality of the detection wave M, a dielectric lens 136 may be attached to an antenna surface of the antenna 135.

Although not shown, the transmission and reception means 130 may be placed on an inner tube 115, and a waveguide or a coaxial cable may be provided inside of the inner tube 115 and connected to the antenna 135. Thereby, it is possible to protect the transmission and reception means 130 from high temperatures of the blast furnace 1.

It is preferably to use a microwave or a millimeter wave as the detection wave M because temperature inside of the furnace is high and dust and water vapor exist in the furnace. In particular, the millimeter wave is preferable because the millimeter wave has a shorter wavelength and higher directionality than the microwave.

Note that, the rotating plate 120, the transmission and reception means 130, the antenna 135, the angle fixed reflection plate 138, an angle variable reflection plate 140 (which will be described later) and peripheral devices thereof are constitutional members of the "detection unit".

The rotary shaft 110 has a double tube structure, and an end portion of an outer tube 111 on the opening part 2-side is fixed to the rotating plate 120. An outer peripheral surface of the outer tube 111 is provided with a gear 112, and the gear 112 is in mesh with a gear 155 of a motor 113. Therefore, when the motor 113 is driven, the rotary shaft 110 fixed to the outer tube 111 rotates horizontally with respect to the opening part 2 of the blast furnace 1, as shown with a reference sign Y in FIG. 8.

In the meantime, an angle variable reflection plate 140 having a reflection surface 140a whose inclination angle varies in a direction denoted with a reference sign X in FIG. 8 is attached to an end portion of an inner tube 115 of the rotary shaft 110 on the opening part 2-side, via a link mechanism 117. In the angle variable reflection plate 140, a first link 117a of the link mechanism 117 is fixed to a center of an opposite surface to the reflection surface 140a, a second link 117b is coupled to the first link 117a, and a tip end of the inner tube 115 is coupled to the second link 117b. The other end of the inner tube 115 is formed with a rack gear 118, and the rack gear 118 is in mesh with a gear 119 of a motor (not shown), so that when the motor is driven, the gear 119 rotates and the rotation is converted into a linear motion by the rack gear 118. Then, as shown with a reference sign H in FIG. 8, the inner tube 115 is moved linearly toward the angle variable reflection plate 140 or toward an opposite side.

Also, as shown in FIG. 9, support shafts 141 and 141 protrude from both diametrical ends of the angle variable reflection plate 140, and the support shafts 141 and 141 are rotatably supported to support arms 146 and 146. The support arms 146 and 146 are attached to a support arm holding rod 145 attached to the rotating plate 120.

Therefore, when the inner tube 115 moves toward (moves down in FIG. 8) the angle variable reflection plate 140, the reflection surface 140a of the angle variable reflection plate 140 is tilted toward an inner wall 1a of the blast furnace 1 via the link mechanism 117, and when the inner tube 115 moves toward (moves up in FIG. 9) an opposite side to the angle variable reflection plate 140, the reflection surface 140a of the angle variable reflection plate 140 is tilted toward the axis line C of the blast furnace 1 via the link mechanism 117. That is, the inner tube 115 moves down and up, so that the inclination of the reflection surface 140a of the angle variable reflection plate 140 can be changed in a direction denoted with a reference sign X in FIG. 8.

The angle fixed reflection plate 138 and the angle variable reflection plate 140 are also disposed to face each other, and as shown in FIG. 8, the detection wave M from the transmission and reception means 130 is reflected from the antenna 135 on the reflection surface 138a of the angle fixed reflection plate 138, is transmitted to the reflection surface 140a of the angle variable reflection plate 140, and is then transmitted from the reflection surface 140a of the angle variable reflection plate 140 into the furnace through the opening part 2 of the blast furnace 1. At this time, by changing the inclination angle X of the reflection surface 140a of the angle variable reflection plate 140, a transmission path of the detection wave M into the furnace swings in the right and left direction in FIG. 8, as denoted with a reference sign Z, and becomes linear along the diametrical direction of the rotating plate 120. An amplitude of the detection wave M by the angle variable reflection plate 140 is adjusted so that the detection wave M moves in a linear shape from the inner wall 1a of the blast furnace 1 to the axis line C, for example, as shown in FIG. 7.

The detection wave M is reflected on the surface of the burden 20 deposited in the furnace, travels along the same path as that upon transmission and is then received by the transmission and reception means 130. The transmission and reception can be performed in an FM-CW method, for example. That is, the detection wave M (transmission wave) transmitted from the antenna 135 connecting to the transmission and reception means 130, reflected on the angle fixed reflection plate 138, transmitted to the angle variable reflection plate 140 and transmitted from the angle variable reflection plate 140 by a predetermined angle is transmitted into the furnace through the opening part 2 of the blast furnace 1, and is then reflected on the surface of the burden 20, so that a reflected wave thereof travels along an opposite path (the angle variable reflection plate 140→the angle fixed reflection plate 138→the antenna 135→the transmission and reception means 130) and is then detected by the transmission and reception means 130. Then, distance information between the transmission and reception means 130 and the surface of the burden 20 is obtained from a frequency difference (beat frequency) between the transmission wave and the reflected wave.

Figure 10:
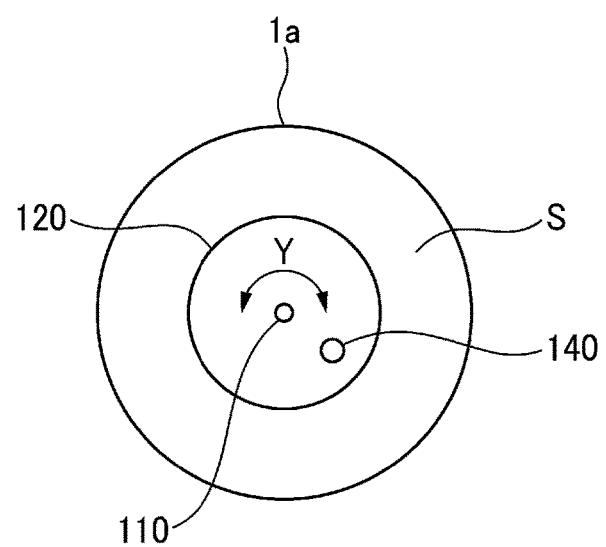
FIG. 10 depicts a scanning area of the detection apparatus shown in FIG. 7.

The detection wave M is linearly transmitted and received by rotating the rotating plate 120 about the rotary shaft 110, so that distance information of a circular part (hereinbelow, referred to as "scanning area S") over an entire area in the furnace of the blast furnace 1 is obtained, as shown in FIG. 10. On the other hand, since a rotation angle of the rotary shaft 110 corresponding to a rotation position of the rotating plate 120 is detected by the encoder 150 connecting to the motor 113, position information of the detection wave M in the scanning area S is obtained. From the distance information and the position information, a surface profile of the scanning area S, i.e., the entire surface of the burden 20 is obtained. Note that, although the transmission and reception by the transmission and reception means 130 may be continuously performed according to the rotation of the rotating plate 120, the transmission and reception by the transmission and reception means 130 may also be performed intermittently each time the rotating plate 120 rotates by a predetermined angle.

In the above detection, the angle variable reflection plate 140 is simply tilted according to the rotation of the rotating plate 120. Therefore, as compared to a case where the entire surface is scanned at one time, it is possible to simplify the apparatus and to reduce a load of a drive source.

Note that, although not shown, the distance information obtained by the transmission and reception means 130 may be wirelessly transmitted to an external calculation circuit, which simplifies a wiring.

The rotation of the rotating plate 120 is also synchronized with the turning of the shooter 200. The rotation of the rotating plate 120 is controlled by a motor control circuit 113A connected to the motor 113. The position information of the encoder 150 is synchronized with the position information of the encoder 210 that controls the turning of the shooter 200.

Note that, "synchronize" means that when the shooter 200 stops, the rotating plate 120 also stops, when the shooter 200 starts to turn, the rotating plate 120 also starts to rotate, and a turning direction of the shooter 200 and a rotation direction of the rotating plate 120 are the same and a turning speed of the shooter 200 and a rotation speed of the rotating plate 120 are the same, as described in the first embodiment and the third embodiment.

When the turning of the shooter 200 and the rotation of the rotating plate 120 are synchronized and the rotation of the rotating plate 120 is stopped, the linear transmission and reception at a rotation stop position are repeated, so that the change in deposited state of the burden 20 at the same position can be measured.

Figure 11:
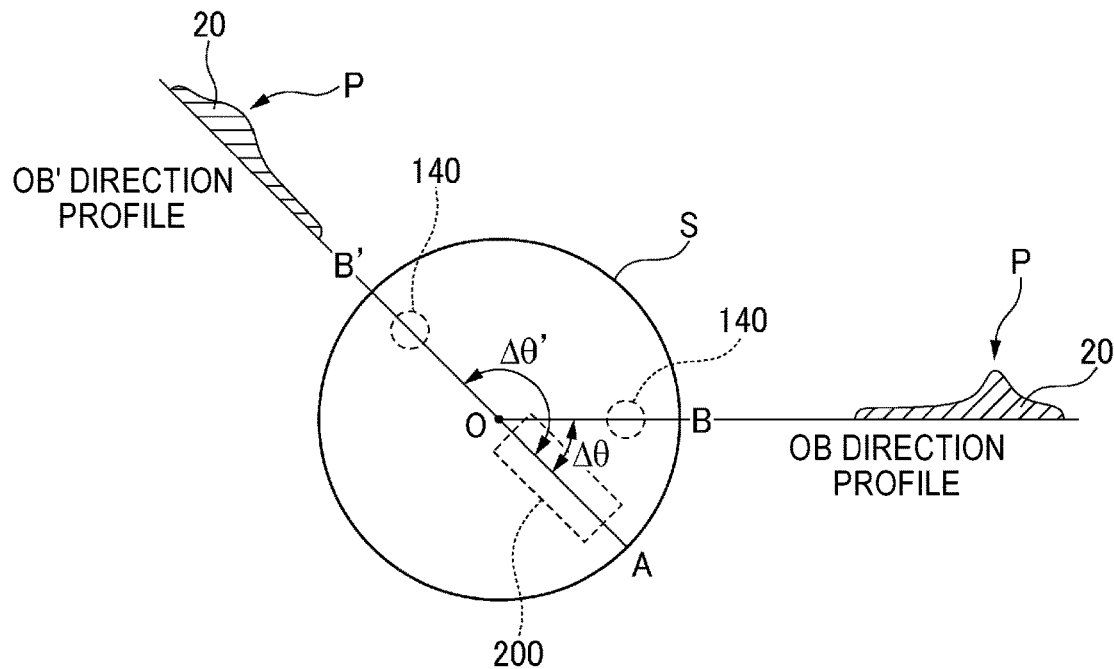
FIG. 11 depicts a scanning area of the detection apparatus shown in FIG. 7 and a turning trajectory of the shooter in an overlapping manner.

FIG. 11 depicts the scanning area S of the detection apparatus 100 and a turning trajectory of the shooter 200 in an overlapping manner. That is, FIG. 11 is a view where since the shooter 200 turns about the axis line C of the blast furnace 1, the axis line C of the blast furnace 1 and the rotary shaft 110 of the rotating plate 120 of the detection apparatus 100 are virtually overlapped at a center O. Also, the circle corresponds to the scanning area S.

Here, when a position of the axis line of the shooter 200 on the circle shown in FIG. 11 at any time is denoted as A and a position of the angle variable reflection plate 140 of the detection apparatus 100 at the same time is denoted as B, FIG. 11 depicts that transmission and reception are performed by the detection apparatus 100 at any time after a time corresponding to a phase difference $\Delta\theta$ from the shooter 200 elapses. Note that, the transmission and reception by the detection wave M at the position B are linearly performed along a radius OB of the same circle. Since the turning of the shooter 200 and the rotation of the rotating plate 120 of the detection apparatus 100 are synchronized, the deposited state of the burden 20 is always detected after the time corresponding to the phase difference $\Delta\theta$ elapses.

For this reason, in the turning of the shooter 200 until the last time, the deposited state of the burden 20 is measured and stored at the time the shooter 200 has reached the position A and is compared to the deposited state of the burden 20 measured at the time the shooter 200 reaches the position A this time. When there is a difference in the deposited state, it is possible to take measures such as changing a drop position and a drop amount of the burden 20 from the shooter 200 immediately after the shooter 200 passes the position A.

Although the burden 20 is one where iron ore, coke, limestone and the like are alternately deposited in a layer shape, the drop positions are different depending on types and particle sizes of the burden 20. In the related art, the drop positions are estimated for each of types and particle diameters of the burdens 20 by calculation equations and the inclination angle (R2 in FIG. 7) of the shooter 200 is adjusted. According to the present invention, since it is possible to detect the deposited state for each of types of the burden 20 at a time close to immediately after the burden 20 is deposited, the deposited state can be reflected in correction of the drop position for each of the same types of the burden 20 when the shooter 200 turns next time. In the meantime, it is possible to detect a trajectory in a circumferential direction at the drop position of the burden 20.

The phase difference $\Delta\theta$ can be arbitrarily set. The smaller the phase difference $\Delta\theta$ is, it is possible to detect the deposited state of the burden 20 in a state close to immediately after the deposition.

Alternatively, as shown in FIG. 11, for example, a diametrically opposite side to the position A of the shooter 200 can be set as the scanning position. In this case, the scanning position is denoted as B' and the phase difference is denoted as $\Delta\theta'$. The deposited state of the burden 20 changes over time after the deposition. The deposited state of the burden 20 at $\Delta\theta$(OB direction profile) and the deposited state of the burden 20 at $\Delta\theta'$ (OB' direction profile) are pictorially shown. In both the states, a peak P is seen at the drop position from the shooter 200. However, in the deposited state at $\Delta\theta'$, the peak P is smaller, and the deposited state is gentler as a whole and changes over time. Like this, it may be preferably to measure the deposited state of the burden 20 at the time the deposited state becomes stable after any time elapses, other than immediately after the burden is dropped from the shooter 200.

In addition, the deposited state of the burden 20 is detected at the two places of the scanning position B and the scanning position B', and a degree of change in the deposited state can be reflected in a next turning mode of the shooter 200.

Note that, the measurement position is not limited to the two places of the position B and the position B' and may also be three or more places.

When detecting the deposited state of the burden 20, the scanning in the diametrical direction of the rotating plate 120 may be continuously performed in synchronization with the turning of the shooter 200. However, the scanning in the diametrical direction of the rotating plate 120 may also be intermittently performed each time the turning of the shooter 200 is progressed by a predetermined angle. The scanning in the diametrical direction of the rotating plate 120 requires a certain amount of time although it is over in a short time. For this reason, for synchronization with the turning of the shooter 200, it is necessary to accelerate the rotation of the rotating plate 120 after the scanning in the diametrical direction of the rotating plate 120 is completed, and it is easy to synchronize the rotation of the rotating plate 120 and the turning of the shooter 200 by performing intermittently the scanning.

In the above, the detection apparatus 100 is one. However, a plurality of the detection apparatuses 100 may also be mounted to the blast furnace 1. For example, in FIG. 7, the detection apparatus 100 is mounted to the right side of the axis line C of the blast furnace 1. However, the detection apparatus 100 may also be mounted to another position (the left side in FIG. 7) about the axis line C of the blast furnace 1. In this way, the detection apparatuses 100 are disposed at the two left and right sides about the axis line C of the blast furnace 1, so that even though the shooter 200 under turning interrupts the detection wave M and a range in which the surface profile of the burden 20 cannot be detected is thus generated, the two detection apparatuses 100 can complement each other. Since the two detection apparatuses 100 can share the scanning area S, the measurement time can also be shortened to a half. When the measurement is performed for the same time, the resolution can be enhanced by increasing the number of measuring points. For example, in a case where the detection apparatus 100 is one and the measurement is performed each time the shooter 200 turns by 10°, if the two detection apparatuses 100 are mounted and $\Delta\theta$ is made different from each other by 5°, the measurement is performed each time the shooter 200 turns by 5°, so that the number of measuring points per one turn of the shooter 200 can be doubled to enhance the resolution.

In the meantime, it is expected that high-temperature heat, dust, water vapor and the like from the inside of the furnace are introduced toward the detection apparatus 100 from the opening part 2 of the blast furnace 1 and interfere with the detection. Therefore, upon the measurement, a purge gas (not shown) such as nitrogen gas may be supplied continuously or intermittently into a receptacle in which the transmission and reception means 130, the antenna 135, the angle fixed reflection plate 138, the angle variable reflection plate 140, the link mechanism 117 and the like are accommodated. The opening part 2 may also be blocked by a filter (not shown) having air permeability and obtained by knitting ceramic heat-resistant fibers such as "Tyranno fiber" available from Ube Industries, Ltd., and the purge gas may be ejected toward the inside of the furnace. In addition, a metallic mesh (not shown) may be provided below the filter to prevent collision of the burden 20 from the inside of the furnace upon the ejection. The tip end of the antenna 135 may also be blocked by an adiabatic material and a filter having air permeability, and the purge gas may be supplied between the adiabatic material and the filter. In addition, an opening and closing valve (not shown) for blocking the opening part 2 may be mounted. Alternatively, a moving means (not shown) for vertically moving up and down the detection apparatus 100 as a whole with respect to the opening part 2 may also be mounted, and the moving means may be positioned at or near the opening part 2 during the measurement, and may be retreated from the opening part 2 during non-measurement, and the opening part 2 may be further blocked by the opening and closing valve, similarly to the first embodiment and the second embodiment. The transmission and reception of the detection wave M are performed at or near the opening part 2, so that the opening diameter of the opening part 2 can be reduced to reduce the influence of the heat from the blast furnace 1 and the construction cost can be reduced.

Fourth Embodiment

In the third embodiment, in order to perform the transmission and reception of the detection wave M in a linear shape, the mechanical operation of disposing the angle fixed reflection plate 138 and the angle variable reflection plate 140 so as to face each other and changing the inclination angle of the reflection surface 140*a* of the angle variable reflection plate 140 is performed. In a fourth embodiment, the transmission and reception of the detection wave M are performed in a linear shape by electrically changing a phase of the detection wave M.

Figure 12:
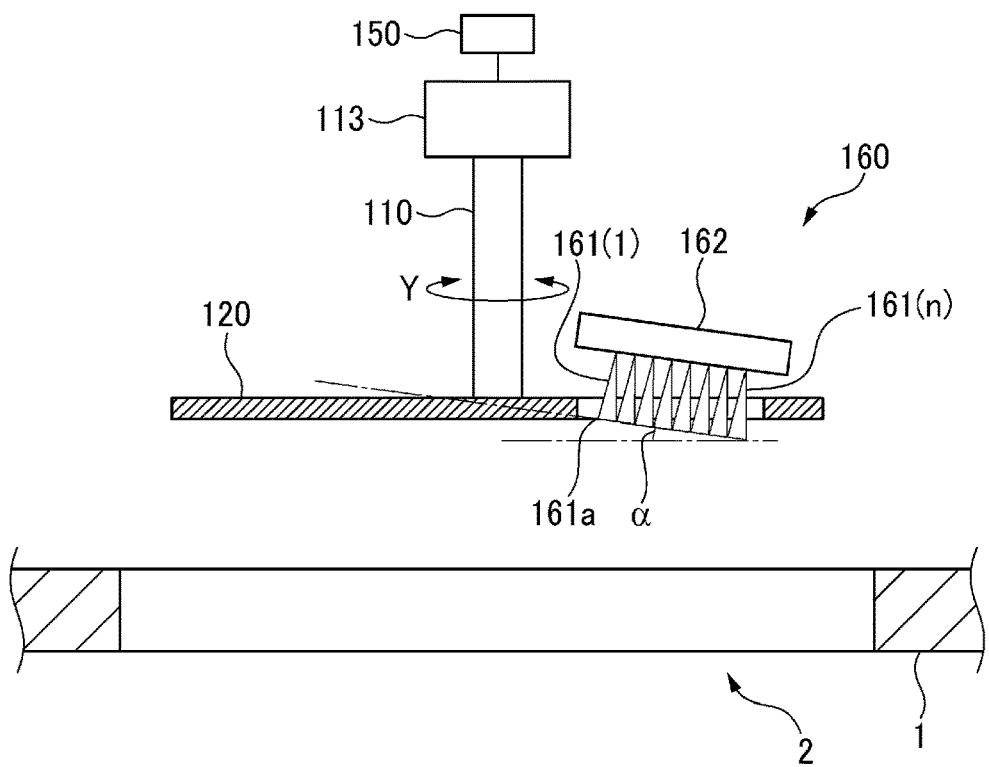
FIG. 12 depicts a fourth embodiment of the detection apparatus.
Figure 13:
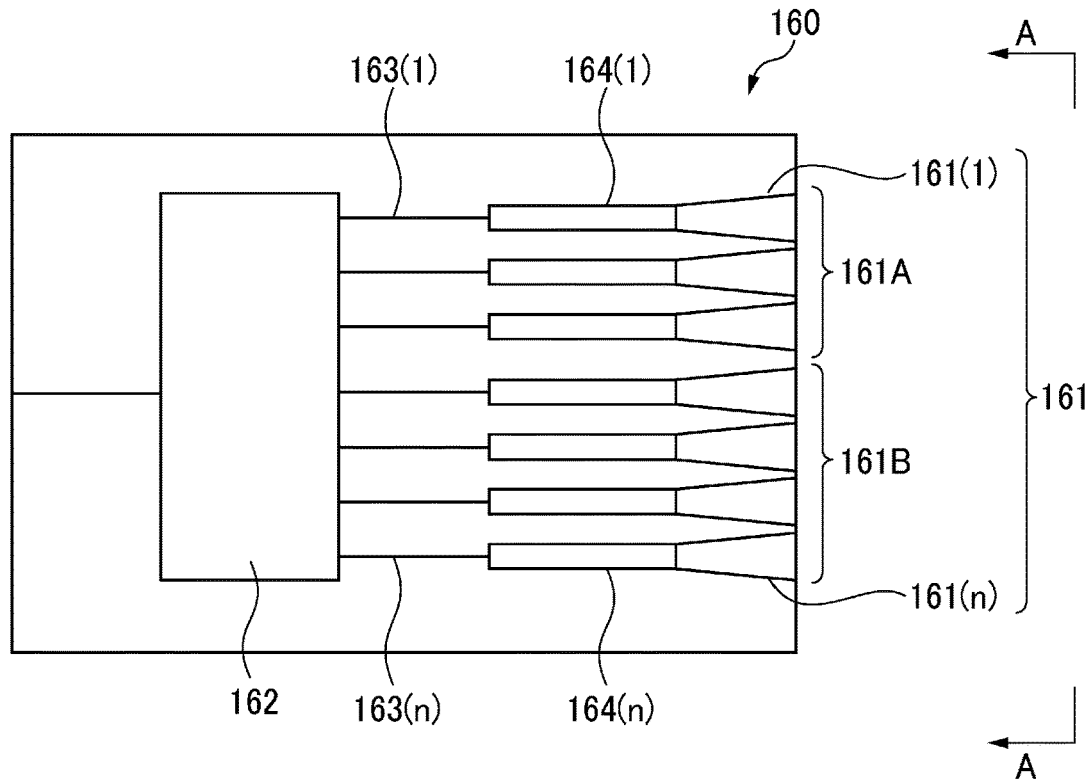
FIG. 13 is a schematic view depicting a configuration of a phased array module.
Figure 14:
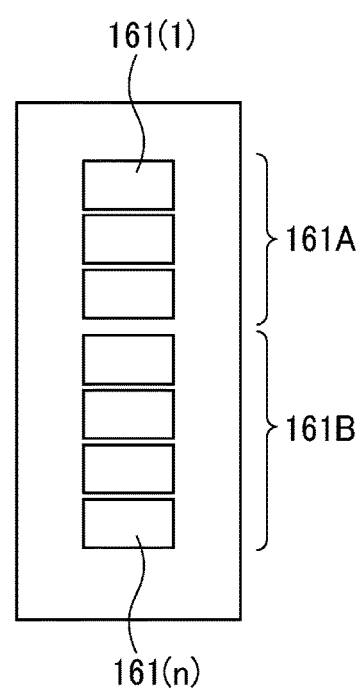
FIG. 14 is a view as seen from an A-A arrow direction of FIG. 13.

As such an apparatus, a phased array module may be exemplified. As shown in FIGS. 12 to 14, a phased array module 160 includes n antenna elements 161(1) to 161(*n*) connected to a phase shifter 162, and the antenna elements 161(1) to 161(*n*) are each connected to the phase shifter 162 for controlling a phase of a millimeter wave or a microwave to be supplied by microstrip lines 163(1) to 163(*n*). The phased array module 160 is configured to change each phase shift amount from the phase shifter 162 to the antenna elements 161(1) to 161(*n*) to change the directionalities (the transmission and reception direction of the detection wave M) of the antenna elements 161(1) to 161(*n*), thereby performing linear scanning along a continuous mounting direction (the right and left direction in FIG. 12) of the antenna elements 161(1) to 161(*n*).

As shown in FIG. 13, the antenna elements 161(1) to 161(*n*) are preferably divided into an antenna element group 161A for transmission and an antenna element group 161B for reception. The transmission and reception of the detection wave M may be performed in the FM-CW method. If each of the antenna elements 161(1) to 161(*n*) performs both the transmission and the reception, each receives the detection wave M from the adjacent antenna element, which may be a noise. However, the antenna elements 161(1) to 161(*n*) are divided into the antenna element group 161A for transmission and the antenna element group 161B for reception, so that the transmission and reception can be performed more accurately and securely.

The antenna elements 161(1) to 161(*n*) are each preferably configured by a horn antenna so as to endure the high-temperature heat from the blast furnace 1. Also, a square flat antenna having a large aspect ratio is more preferable because it is possible to improve the directionality. Note that, when using the horn antenna, each of the microstrip lines 163(1) to 163(*n*) and each of the horn antennas are connected by using waveguides 164(1) to 164(*n*). However, it is necessary to adjust the connection by a tube length of each of the waveguides 164(1) to 164(*n*) so that phases at the antenna connection portions are matched.

The phased array module 160 is attached to the rotating plate 120 so that antenna end faces 161*a* of the antenna elements 161(1) to 161(*n*) face toward the opening part 2 of the blast furnace 1 and the continuous mounting direction of the antenna elements 161(1) to 161(*n*) follows the diametrical direction (the right and left direction in FIG. 12) of the rotating plate 120. As shown in FIG. 12, the phased array module 160 may be attached to the rotating plate 120 in an aspect where a line connecting the antenna end faces 161*a* is tilted relative to a plate surface of the rotating plate 120 by an angle α or the line connecting the antenna end faces 161*a* and the plate surface of the rotating plate 120 are parallel, i.e., the angle is 0. The phased array module 160 is attached to the rotating plate 120 with being tilted, so that it is possible to reduce the opening diameter of the opening part 2 of the blast furnace 1. In a pressure vessel such as the blast furnace 1, a pressure is applied to the detection apparatus. However, it is possible to reduce the pressure by reducing the opening diameter of the opening part 2.

The phased array module 160 is used, so that the angle fixed reflection plate 138 and the angle variable reflection plate 140 in the third embodiment are not required and the link mechanism 117 for controlling the inclination angle of the reflection surface 140*a* of the angle variable reflection plate 140 and the drive source for moving up or down the inner tube 115 are not also required. For this reason, the rotating plate 120 can also be directly attached to the rotary shaft 110 and the rotary shaft 110 has only to be rotated by the motor 113, so that it is possible to simplify the apparatus.

Figure 15:
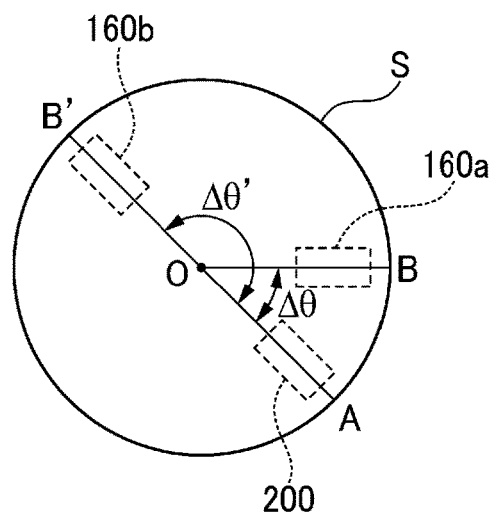
FIG. 15 depicts an example where a plurality of (two, in the shown example) phased array modules is attached to a rotating plate.
Figure 16:
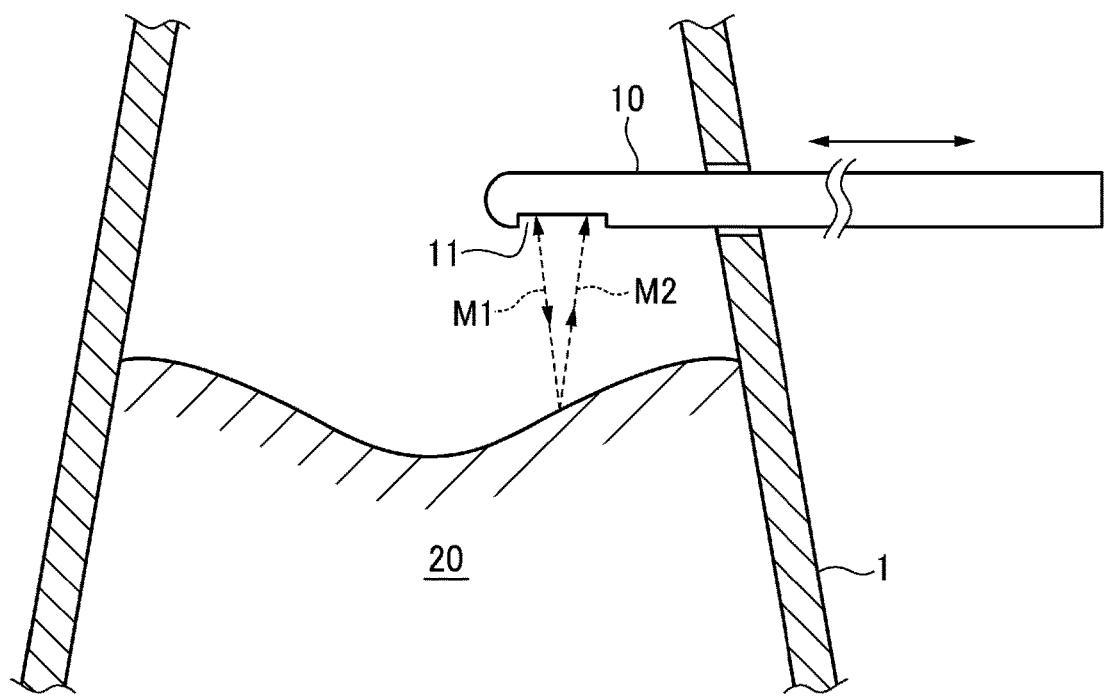
FIG. 16 is a schematic view depicting a conventional lance-type detection apparatus.
Figure 17:
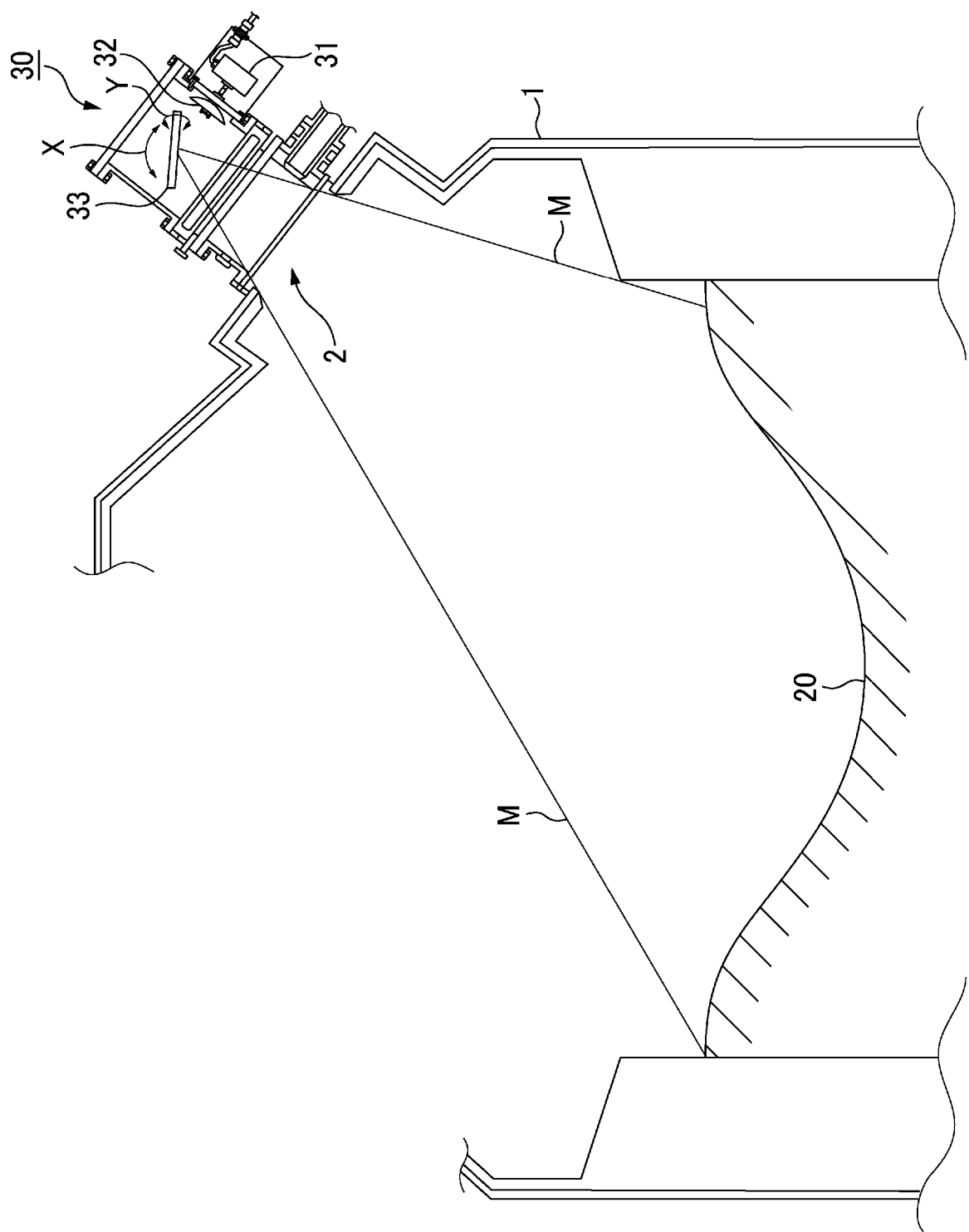
FIG. 17 is a schematic view depicting a detection apparatus disclosed in PTL 1.

Since the phased array module 160 is a modularized small component and is not a movable component such as the angle variable reflection plate 140, a plurality of the phased array modules 160 can also be attached to the rotating plate 120. For example, FIG. 15 is a view according to FIG. 11, in which phased array modules 160*a* and 160*b* can be attached in a position B at Δθ and in a position B' at Δθ' with respect to the position A of the shooter 200. Thereby, it is possible to detect the deposited state of the burden 20 close to immediately after the burden is dropped and deposited from the shooter 200 at the position B and the deposited state of the burden 20 in a stable deposited state at the position B' at one time, and to reflect each detection result in a next turning mode of the shooter 200, so that it is possible to supply the burden 20 closer to the theoretical deposition profile.

Similarly to the first to third embodiments, a configuration is also possible in which the phased array module 160 is moved up and down with respect to the opening part 2 together with the rotating plate 120, the phased array module 160 is positioned at or near the opening part 2 during the measurement and is retreated from the opening part 2 during the non-measurement and the opening part 2 is further blocked by the opening and closing valve. The transmission and reception of the detection wave M are performed at or near the opening part 2, so that the opening diameter of the opening part 2 can be reduced to reduce the influence of the heat from the blast furnace 1 and the construction cost can be reduced.

(Operation Method)

The present invention also includes supplying the burden 20 from the shooter 200 by bringing the surface profile close to the theoretical deposition profile suitable for a stable operation, based on the surface profile of the burden 20 detected by the detection apparatus 100, thereby performing a more stable operation. For example, the measured surface profile is immediately transmitted to a control circuit (not shown) of the shooter 200, so that it is possible to control a turning angle in the R1 direction of the shooter 200, the inclination angle R2 and the drop amount of the burden 20 at each positon on time.

Although the diverse embodiments have been described with reference to the drawings, the present invention is not limited to the embodiments. It is obvious to one skilled in the art that a variety of changes and modifications can be conceivable within the scope defined in the claims, and it is understood that the changes and modifications are included in the technical scope of the present invention. In addition, the respective constitutional elements in the embodiments can be arbitrarily combined without departing from the gist of the invention.

The subject application is based on Japanese Patent Application Nos. 2019-102613 filed on May 31, 2019 and 2019-127900 filed on Jul. 9, 2019, the contents of which are incorporated herein by reference.

REFERENCE SIGNS LIST

1: blast furnace
2: opening
20: burden
100: detection apparatus
110: rotary shaft
111: outer tube
114: coupling rod
115: inner tube
117: link mechanism
120: rotating plate
130: transmission and reception means
135: antenna
138, 138A, 138B, 138C: angle fixed reflection plate
140: angle variable reflection plate
150: encoder (rotating plate-side)
160, 160a, 160b: phased array module
161, 161(1) to 161(n): antenna element
162: phase shifter
163 (1) to 163 (n): microstrip line
164 (1) to 164 (n): waveguide
200: shooter
210: encoder (shooter-side)

The invention claimed is:

1. A surface profile detection apparatus of a burden in a blast furnace,
wherein the surface profile detection apparatus is configured to detect a surface profile of the burden such as iron ore, coke, limestone and the like in the blast furnace, to which the burden is supplied by a shooter, by transmitting a detection wave toward a surface of the burden deposited in the furnace and receiving the detection wave reflected on the surface of the burden, through an opening part of the blast furnace,
wherein the surface profile detection apparatus comprises:
a rotating plate mounted immediately above the opening part and configured to rotate about an opening center of the opening part as a central axis;
a rotating means for rotating the rotating plate; and
a transmission and reception means for transmitting the detection wave in a linear shape along a diametrical direction of the rotating plate and receiving the detection wave,
wherein the surface profile detection apparatus comprises:
a tubular rotary shaft attached concentrically with an opening of the rotating plate formed at a central part and having an antenna accommodated therein,
the transmission and reception means mounted above an end portion of the rotary shaft on an opposite side to the opening part and connected to the antenna,
an angle variable reflection plate disposed in a space between the rotating plate and the opening part, and having a reflection surface whose angle is variable, and
an angle fixed reflection plate disposed in a space between the rotating plate and the opening part, having a reflection surface whose angle is fixed, and provided so as to transmit the detection wave from the antenna to the reflection surface of the angle variable reflection plate, and
wherein the angle variable reflection plate and the angle fixed reflection plate are attached to the rotating plate.

2. The surface profile detection apparatus of a burden in a blast furnace according to claim 1, wherein the angle fixed reflection plate comprises a first angle fixed reflection plate configured to reflect the detection wave from the antenna, a second angle fixed reflection plate disposed to face the first angle fixed reflection plate and configured to reflect the detection wave reflected on the first angle fixed reflection plate, and a third angle fixed reflection plate disposed to face the second angle fixed reflection plate and configured to reflect the detection wave reflected on the second angle fixed reflection plate, and
wherein the surface profile detection apparatus is configured to transmit the detection wave reflected on the third angle fixed reflection plate toward the angle variable reflection plate.

3. The surface profile detection apparatus of a burden in a blast furnace according to claim 1, wherein the detection wave is a microwave or a millimeter wave.

4. The surface profile detection apparatus of a burden in a blast furnace according to claim 1, wherein the surface profile detection apparatus is configured to intermittently perform scanning in the diametrical direction of the rotating plate and to perform transmission and reception by the transmission and reception means each time turning of the shooter is progressed by a predetermined angle.

5. An operation method comprising:
measuring a surface profile of the burden by using the surface profile detection apparatus of a burden in a blast furnace according to claim 1, and
supplying the burden, based on the surface profile.

6. The operation method according to claim 5, wherein the supply of the burden is performed by controlling a drop position or a drop amount of the burden from the shooter.

\* \* \* \* \*